July 23, 1935.  F. H. SCANTLEBURY  2,009,209
ILLUMINATED MEASURING DEVICE
Filed March 10, 1932   3 Sheets-Sheet 1
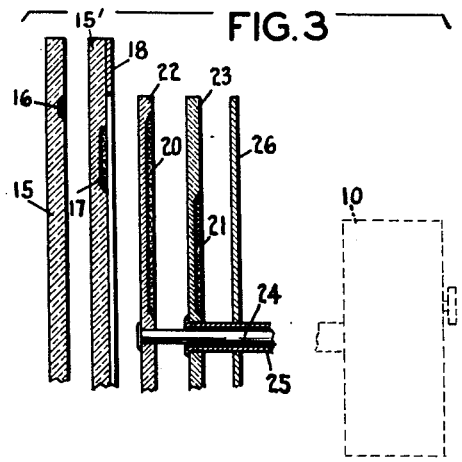
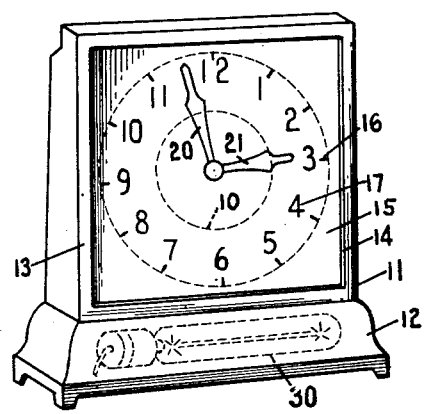
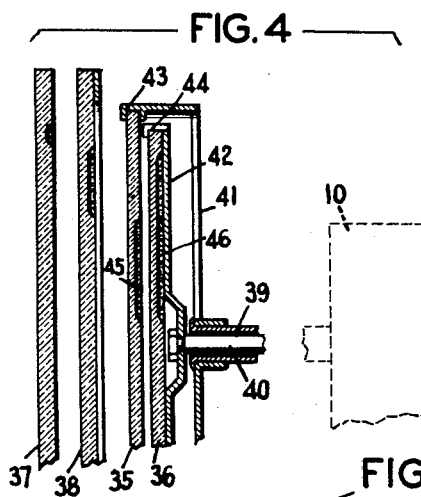
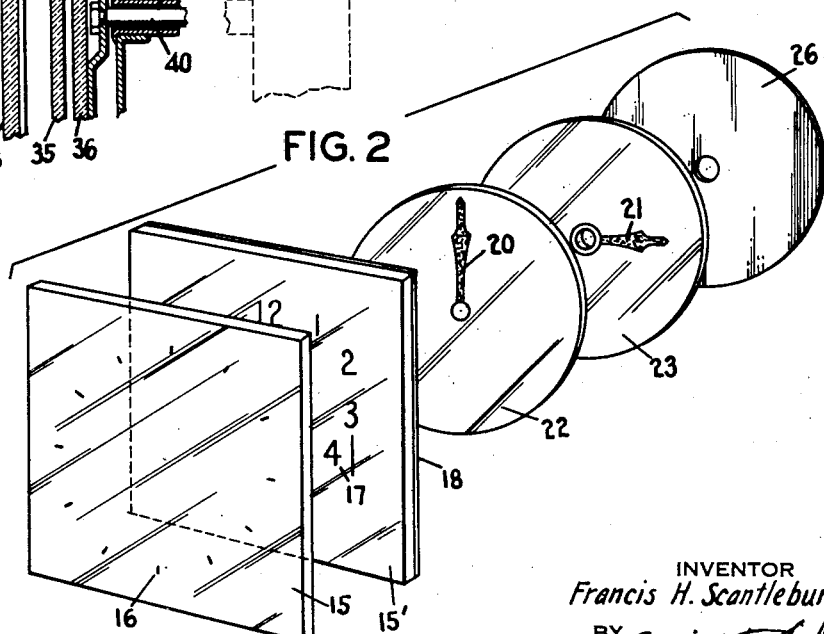
INVENTOR
Francis H. Scantlebury
BY
ATTORNEY July 23, 1935.  F. H. SCANTLEBURY  2,009,209
ILLUMINATED MEASURING DEVICE
Filed March 10, 1932   3 Sheets-Sheet 2

INVENTOR
Francis H. Scantlebury
BY
ATTORNEY

July 23, 1935.  F. H. SCANTLEBURY  2,009,209
ILLUMINATED MEASURING DEVICE
Filed March 10, 1932  3 Sheets-Sheet 3
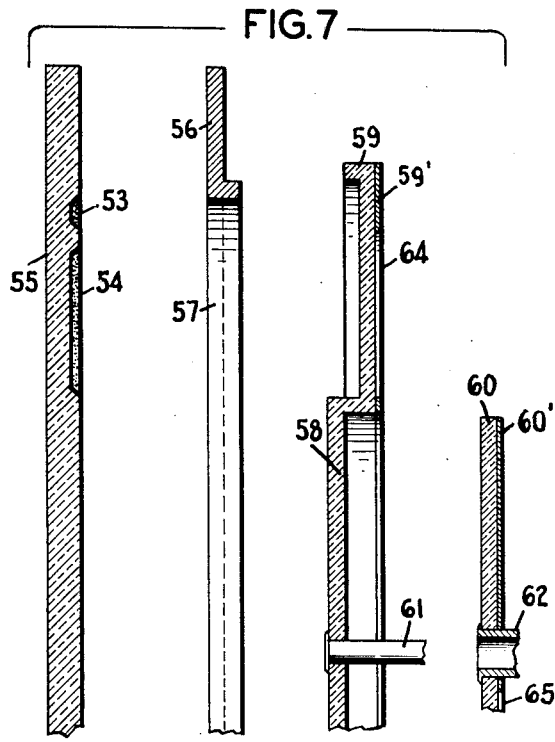
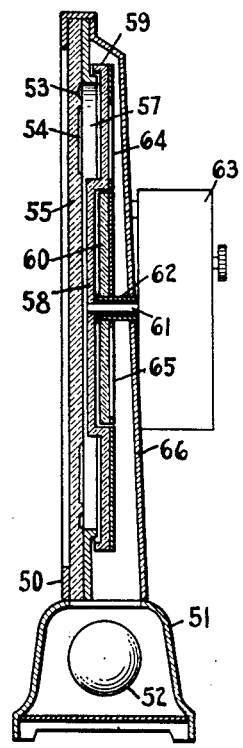
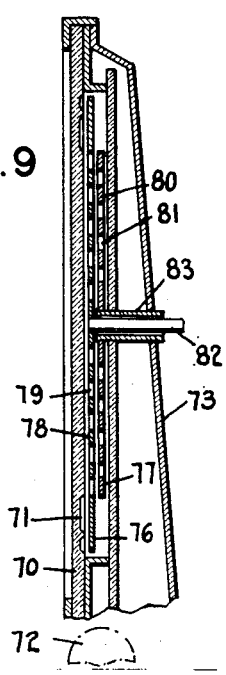
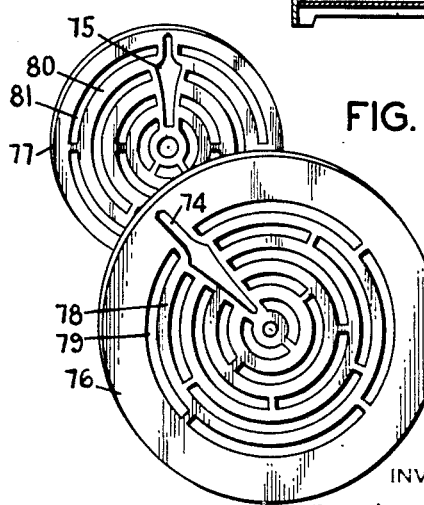

Patented July 23, 1935

2,009,209

UNITED STATES PATENT OFFICE 2,009,209

ILLUMINATED MEASURING DEVICE

Francis H. Scantlebury, Brooklyn, N. Y.

Application March 10, 1932, Serial No. 598,003

11 Claims. (Cl. 240—2.1)

The invention relates to illuminated measuring devices, as of the edge-lighted or back-lighted type and embodying one or more sheets of transparent glass or other transparent or translucent or perforated opaque material, the same bearing suitable designs or configurations and a part of which may be constituted by subdivisions for association with an element caused to move relatively thereto. The said configurations may be etched or sand-blasted into the surface of a glass plate when utilized and in which case they are illuminated by refracted light entering one or more of the edges of the glass; or, the configurations may be otherwise provided on a plate with the light directed therethrough.

The invention, for example, may embody illuminated time pieces, measuring apparatus, advertising devices with movable display matter, etc., and is especially adaptable to synchronous electric motor operated time pieces or devices wherein the power for effecting the operation of a time piece may also serve to provide the desired illumination.

The invention has for an object to effectively associate illuminated configurations on a dial or like plate with a movable member or members and in a manner such that these will also be clearly visible when the dial member is illuminated, making the device particularly suitable for use in darkened surroundings as well as in daylight when the device is not illuminated.

A further object of the invention resides in a simple and inexpensive construction which may readily be adapted to various devices and particularly to time-pieces of standard construction, especially to electrically-operated time pieces.

In carrying out the invention, one or more plates may serve to close in whole or in part the front of a suitable case or cabinet for housing the driving mechanism of the movable member or members to be associated with suitable configurations or divisions provided upon said plate or plates constituting the dial. The plate or plates may be of transparent glass or other transparent or translucent material, or may comprise perforated opaque material whose perforations then provide the desired configurations and are adapted to have light directed therethrough to illuminate the same. It is preferred, however, to provide the configurations in a plate or plates of transparent glass and to then edge-illuminate the configurations in the desired colors, for example, substantially in the manner more particularly set forth in a prior U. S. Letters Patent No. 1,707,965 granted to me the 2nd day of April, 1929. In any event, a configuration-bearing plate is provided with a transparent portion or with an aperture through which the movable member is visible, the same being located behind said plate, or in the case of an aperture therein, may be located within the plane of said plate or plates. Provision is made, also, for the illumination of this movable member which may be in the nature of a pointer element or portion in juxtaposed relationship to the configurations of the configuration-bearing plate in the case of a measuring or time device. The pointer element may be variously provided in connection with an element movable with reference to the configuration-bearing plate and suitably driven from an electric or other clock mechanism; or, the movable element may embody illuminated advertising or like matter.

Provision is made, furthermore, for illuminating this pointer or other portions, either by back-lighting the same, that is to say, directing light therethrough from behind a movable plate or by etching the pointer portion into a plate of transparent glass and edge-lighting the same simultaneously with the edge-lighting of the configuration-bearing plate associated therewith.

The nature of the invention, however, will best be understood when described in connection with the accompanying drawings, in which:

Fig. 1 is a perspective view of a device, such as an electrically driven clock, illuminated in the novel manner hereinafter set forth.

Fig. 2 is an exploded view of the configuration-bearing plates and pointer-bearing disks.

Fig. 3 is a fragmentary vertical exploded section of the said elements and driving means therefor; and Fig. 4 is a similar view illustrating a modification.

Fig. 7 is a fragmentary enlarged exploded view of the same.

Fig. 8 is a vertical section of the modified form of the novel illuminated device.

Fig. 9 is a fragmentary vertical section of a further modification of the novel device, and Fig. 10 is an exploded view of the pointer providing disk members utilized therein.

Figure 5:
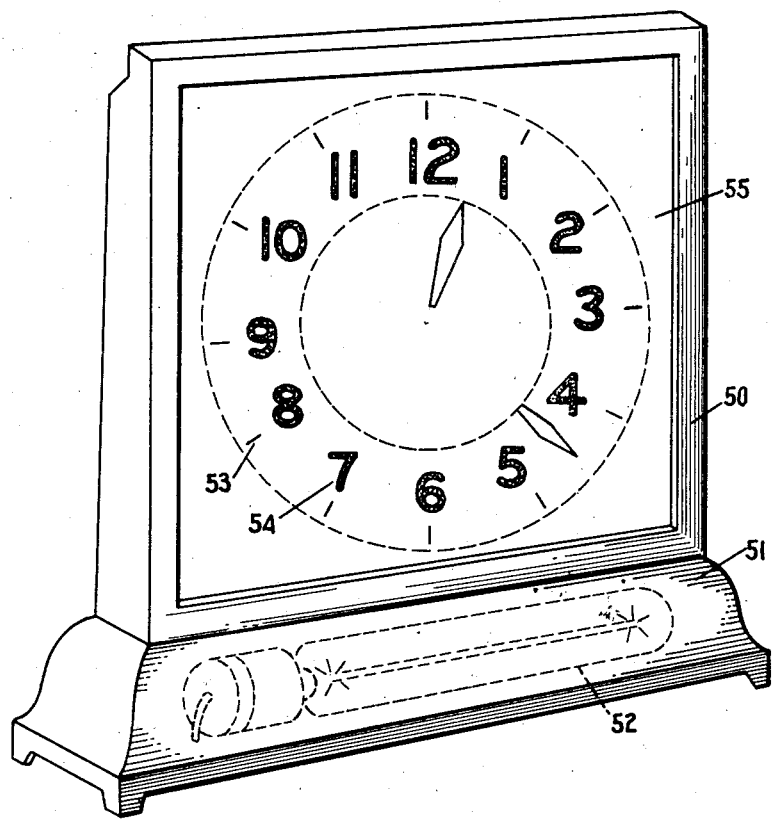
Fig. 5 is a perspective view of an electric clock embodying a modified form of the invention.

Referring to Figs. 1–3 of the drawings, the invention is illustrated as embodied in a time piece, more particularly of the synchronous electric motor operated type, although the invention is not to be understood as restricted to clocks of this type, as the ordinary spring-operated clock may also be employed, particularly where alternating current is not available. Also, the invention is applicable to other measuring apparatus embodying a scale and the like and a member movable in relation thereto, as well as to advertising devices, the movable member then serving to display periodically the desired matter at a selected portion of the configuration-bearing plate or member.

The entire mechanism, including the motor 10, is shown as housed within a suitable case or cabinet 11 mounted upon a base 12. The front wall 13 of the cabinet is provided with an aperture 14 to expose the face of the clock, said opening in the present instance being square but, of course, the particular design of the opening may be varied as desired. Through this aperture 14 is visible a dial plate 15 carrying the desired design or configurations such as the time subdivisions 16 and numerals 17 and any other ornamentation or the like as may be desired. One or more of these plates may be employed for the purpose as indicated in Figs. 2 and 3, the outer plate 15 bearing, for example, the time subdivisions 16 and the other plate 15' the numerals 17. In the present embodiment, these plates are indicated as of transparent glass and the time subdivisions and numerals are correspondingly etched or sand-blasted therein as is well understood and illuminated in the desired colors as is more particularly set forth in my aforesaid U. S. Letters Patent.

An annular opaque member 18 is provided behind the plates to mask the circumferential configuration-bearing portion thereof which plates remain transparent except, of course, at the etched or sand-blasted portions. Through these registering transparent portions of the two adjacent plates which are to be located as closely together as possible there is designed to be exposed pointer portions 20 and 21 simulating, for example, the hands of a clock and radiating from the center of corresponding disks 22 and 23. In the particular embodiment under consideration, these disks may comprise transparent sheets of glass in which the pointers 20 and 21, representing respectively the minute hand and the hour hand of a clock, are etched or sand-blasted. These disks, furthermore, are adapted for rotation, for example, with the arbors 24 and 25, respectively, upon which they are coaxially mounted, said arbors being driven from the motor 10. Behind the rearmost disks 23 is provided an opaque and dark-surfaced disk 26 as a background member contrasting with the illuminated pointer portions 20 and 21.

In the base 12 may be mounted a lamp 30 of the elongated type and located beneath the edges of the plate 15 and 15' as well as of the disks 22 and 23, so that rays of light from this lamp may be refracted through the various disks and plates for correspondingly illuminating their respective configurations and pointer portions. By the foregoing arrangement, when lamp 30 is energized the subdivisions and numerals of the plates 15 and 15' will be brightly illuminated, preferably in different colors, and an illuminated pointer portion will travel in relation thereto as the disks 22 and 23 are correspondingly rotated, said pointer portion standing out prominently against the darkened background or surface of opaque disk 26 and a very effective illuminated clock device is had. When the clock is not illuminated, the pointers being in a color contrasting with that of the background serve, nevertheless, as indicators of the time, and the configurations associated with the pointers will also be displayed with sufficient prominence to afford a ready reading.

In Fig. 4 a modification in the mounting of the pointer-bearing disks 35 and 36 is indicated, the same being mounted behind the configuration-bearing plates 37 and 38 as in the previous embodiment, but are carried on the arbors 39 and 40 through respective holding members 41 and 42 which have the outwardly extending prongs 43 and 44, respectively, for clamping a corresponding disk at different points over its circumference, but not of sufficient number to interfere with the edge-lighting of a disk. The holding member 42 for disk 36 is in the nature of an opaque disk completely backing the said plate and thus obscuring the mechanism behind the same. Plate 35, as in the previously described embodiment, may have etched therein the hour hand portion 45, while the plate 36 which is transparent may similarly be provided with the etched minute hand portion 46.

Figure 6:
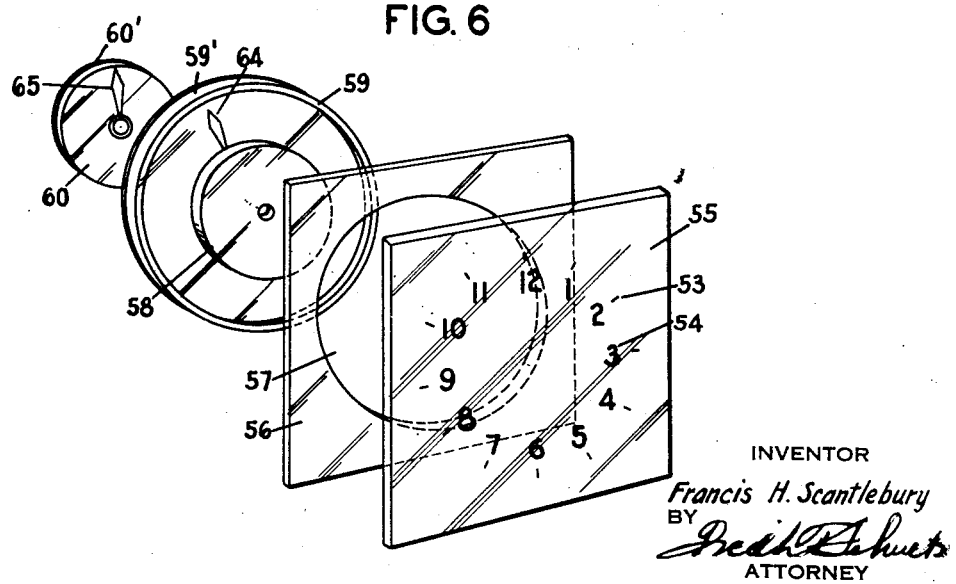
Fig. 6 is an exploded view of the configuration-bearing plate and pointer disks associated therewith.

In Figs. 5–8, a further modification is illustrated, the mechanism being similarly retained within a case 50 having the base 51 which supports the lamp 52 for illuminating the configurations embodying the time subdivisions 53 and numerals 54, in the present embodiment shown as provided on a single plate 55, and therefore displayed in the same color. Behind the plate 55 is located an opaque plate 56 with circular centrally disposed aperture 57. A dished member comprising the dished portion 58 and flange 59 is arranged to have the portion 58 rotate coaxially within the aperture 57, the said dished portion being transparent to display therethrough a further rotating member 60, both of said members being coaxially mounted upon the respective arbors 61 and 62 and driven from the motor 63.

The flange 59 of the dished member is backed by an opaque annular disk 59' save for a cut-away portion 64 representing a pointer element radially disposed thereon; and, similarly, the rotating disk member 60 is backed by an annular disk 60' which is opaque save for a transparent portion 65 also representing a pointer element radially disposed thereon. When, therefore, the various members are assembled as indicated in Fig. 8 of the drawings with the rotating disk member 60 fitting within the dished portion 58, pointer 65 will be visible through the said dished portion and the pointer 64 as well as pointer 65 through the aperture 57 and transparent central portion of plate 55, the said pointer portions being in juxtaposition to the time subdivisions and numerals of the latter plate. Lamp 52 serves to edge-illuminate the configurations 53 and 54 of plate 55, and rays therefrom are also directed through the pointer portions 64 and 65 as by means of a reflecting surface constituted by the rear plate 66 of the case, said surface to this end being highly polished.

In Figs. 9 and 10, an arrangement is indicated wherein the disks for the respective pointer portions are of opaque material, light being adapted to be transmitted through cut-away portions thereof rather than illuminating the same through the edge of a transparent plate, as in the embodiments described in Figs. 1 to 6. However, the forward plate 70 is provided with the etched configurations 71 which are illuminated from the lamp 72, rays from the lamp in this instance being further reflected by the plate 73 which may be highly polished over its inner surface for directing the rays through radial cutaway portions or pointers 74 and 75 representing respectively the minute and hour pointer members. These pointer members are provided in disks 76 and 77 of suitable opaque material as of metal stampings. Each disk comprises a succession of circular alternate concentric solid portions 78 and slotted portions 79 for the disk 76 and circular alternate concentric solid portions 80 and slotted portions 81 for the disk 77.

The respective solid portions of one disk are arranged to overlap the corresponding slotted portions of the other disk when the two disks are mounted coaxially upon the respective arbors 82 and 83 for rotating the disks whereby when viewed through the central transparent portion of plate 70, the ensemble will present a solid black disk with the minute pointer 74 and hour pointer 75 displayed thereon in a series of dashes radiating from the axis of the rotation of the disks.

I claim:

1. An illuminated device, comprising a transparent configuration-bearing plate, a transparent movable element associated therewith and having an illuminable pointer portion thereon in juxtaposition to the configurations of said plate and visible through a portion thereof, and means to edge illuminate both the configurations and the pointer portion.

2. An illuminated device, comprising a transparent configuration-bearing plate, a transparent movable element associated therewith and having an illuminable pointer portion thereon in juxtaposition to the configurations of said plate and visible through a portion thereof, an opaque member backing the movable element, and means to edge illuminate both the configurations and the pointer portion.

3. An illuminated device, comprising a transparent glass plate having etched configurations, a second movable and transparent glass plate located behind said transparent etched glass plate and having a radially disposed etched pointer portion in juxtaposition to the configurations of the first-named plate, a transparent plate coaxially movable behind said first-named movable glass plate and also provided with a juxtaposed pointer portion, and means to edge-illuminate all of the said transparent plates.

4. An illuminated device, comprising a transparent glass plate having etched configurations, a second movable and transparent glass plate located behind said transparent etched glass plate and having a radially disposed etched pointer portion in juxtaposition to the configurations of the first-named plate, a transparent plate coaxially movable behind said first-named movable glass plate and also provided with a juxtaposed pointer portion, an opaque background member located behind the coaxially movable plate, and means to edge-illuminate all of the said transparent plates.

5. An illuminated device, comprising a transparent glass plate bearing etched configurations, two coaxial transparent glass plates located one behind the other and both behind said configuration-bearing plate, said coaxial plates having respective radially disposed etched pointer portions in juxtaposition to the said configurations, an opaque backing and holding member for the rearmost of the coaxial plates and having means to retain said plate at points over its circumference, a second holding member having means to retain the foremost of the coaxial plates at points over its circumference, coaxial driving means for supporting and moving the respective holding elements, and means to edge-illuminate the coaxial transparent glass plates and the configuration-bearing plate.

6. An illuminated device, comprising a configuration-bearing plate, an apertured opaque member behind said configuration-bearing plate, the latter having a transparent portion registering with the aperture, a transparent dished member with flange having its central dished portion of lesser diameter than the aperture and the flange of said dished portion being opaque save for a radially disposed pointer portion and visible through the aperture, a coaxial movable member located behind the central portion of the dished member and having a transparent radially disposed pointer portion visible through the central transparent portion of the dished member and both of the pointer portions being in juxtaposition to the configurations of the configuration-bearing plate, means to move the dished member and its coaxially associated movable member, and means to illuminate the configurations and the pointer portions.

7. An illuminated device, comprising a transparent glass plate bearing etched configurations, an apertured opaque member behind said configuration-bearing plate, the latter having a transparent portion registering with the aperture, a transparent dished member with flange having its central dished portion of lesser diameter than the aperture and the flange of said dished portion being opaque save for a radially disposed pointer portion and visible through the aperture, a coaxial movable member located behind the central portion of the dished member and having a transparent radially disposed pointer portion visible through the central transparent portion of the dished member and both of the pointer portions being in juxtaposition to the configurations of the configuration-bearing plate, means to move the dished member and its coaxially associated movable member, a lamp to edge-illuminate the configurations, and a plate to reflect the light from said lamp through said transparent pointer portions.

8. An illuminated device, comprising a configuration-bearing plate, an apertured opaque member behind said configuration-bearing plate, the latter having a transparent portion registering with the aperture, a pair of superposed coaxially mounted rotatable disk members and means to rotate the same, said disk members having successive alternate opaque and transparent annular portions, the opaque portions of one disk registering with the transparent portions of the other and each disk having a radially disposed transparent portion, means to illuminate the configurations, and means to reflect light from said illuminating means through the transparent portions of the rotatable disk members.

9. A fixed, transparent configuration-bearing plate, a second transparent configuration-bearing plate rotatably mounted coaxially with said fixed plate, means to rotate said rotatable plate, and a source of light common to both plates and an edge of each plate being exposed thereto for illumination of the respective configurations.

10. An illuminated device, comprising an illuminable transparent configuration-bearing element, a second element movably associated with the first-named element and having an illuminable pointer portion in juxtaposition to the configurations of said first-named element, and means common to both elements to edge-illuminate the configurations and to illuminate the pointer portion.

11. A fixed, transparent configuration-bearing plate, a second transparent configuration-bearing plate rotatably mounted coaxially with said fixed plate, means to rotate said rotatable plate, a source of light common to both plates and an edge of each plate being exposed thereto for illumination of the respective configurations, and an opaque element backing the rotatable plate.

FRANCIS H. SCANTLEBURY.